US005194089A

United States Patent [19]
Speer et al.

[11] Patent Number: 5,194,089
[45] Date of Patent: Mar. 16, 1993

[54] COATED SPINEL COLOR PIGMENTS, PROCESS FOR THEIR PRODUCTION AND USE

[75] Inventors: Dietrich Speer, Hanau; Akos Kiss, Alzenau-Wasserlos; Peter Kleinschmit, Hanau; Jenny Horst, Gelnhausen, all of Fed. Rep. of Germany

[73] Assignee: Degussa AG, Hanau, Fed. Rep. of Germany

[21] Appl. No.: 697,343

[22] Filed: May 9, 1991

[30] Foreign Application Priority Data

May 10, 1990 [DE] Fed. Rep. of Germany ....... 4014928

[51] Int. Cl.$^5$ ............................................... C09C 3/06
[52] U.S. Cl. ...................... 106/426; 106/431; 106/434; 106/437; 106/439; 106/440; 106/453; 106/454; 106/456; 106/457; 106/459; 106/461; 106/480; 106/481; 106/483; 428/404; 501/17; 501/18
[58] Field of Search ............... 106/434, 439, 437, 461, 106/480, 426, 431, 440, 453, 454, 456, 457, 459, 481, 483; 501/17, 18; 428/404

[56] References Cited

U.S. PATENT DOCUMENTS

| 3,956,005 | 5/1976 | Sugahara et al. | 106/434 |
| 4,696,700 | 9/1987 | Fischer et al. | 106/480 |
| 5,019,169 | 5/1991 | Speer et al. | 106/439 |

FOREIGN PATENT DOCUMENTS 384473 12/1932 European Pat. Off. .
0099491 2/1984 European Pat. Off. .
0294664 5/1988 European Pat. Off. .

OTHER PUBLICATIONS

World Patent Index, Wk 16, 1987, Derwent Publications, Ltd. AN 87-1140, Mar. 10, 1987.
World Patent Index, 1986, Derwent Publications, Ltd., AN 86-244531/37, Feb. 1986.
Eppler, Richard A., "Selecting Ceramic Pigments," *American Ceramic Society Bulletin*, vol. 66, No. 11, 1987, pp. 1600-1604.
Pishch, I. V., et al., "Effects of Mineralizers on the Physiochemical Properties of Pigments," *Glass & Ceramics*, vol. 44, Nos. 3-4, 1987, 174-76.

*Primary Examiner*—Mark L. Bell
*Assistant Examiner*—Scott L. Hertzog
*Attorney, Agent, or Firm*—Beveridge, DeGrandi, Weilacher & Young

[57] ABSTRACT

Coated spinel color pigments with a core of a colored spinel, in particular $CoAl_2O_4$, and a coating glassy layer of a silicate are described. The coating layer is essentially silicon dioxide and one or more oxides of the group of alkali metals, alkaline earth metals, and/or earth metals show a high resistance to bleeding in the presence of glass fluxes, as compared to uncoated spinels. The pigments are produced by sintering, for 0.5 to 5 hours, a powder mixture of the spinel, silicon dioxide, and at least one member chosen from the group of alkali metal halides, alkaline earth metal halides, earth metal halides and mixtures thereof as mineralizer at 900° to 1,300° C. The coated spinel color pigments are suitable for the production of ceramic decorations with improved contour sharpness.

33 Claims, 2 Drawing Sheets

COATED SPINEL COLOR PIGMENTS, PROCESS FOR THEIR PRODUCTION AND USE

BACKGROUND OF THE INVENTION

The invention relates to coated spinel color pigments whose core is formed of a colored spinel and whose coating is a silicate material with a glassy structure. The invention also relates to the production of the coated spinel color pigments, as well as their use for the production of decorations with improved contour sharpness.

Color pigments for coloring and decorating porcelain, earthenware, and other ceramic products which are fired in the presence of glass frits above the softening point of the glass frit, must have high temperature stability, oxidation stability, and glaze stability. For the production of decorations with more or less fine patterns, decorative colors are generally used which essentially consist of a color pigment and a glass frit.

Because of their frequently brilliant colors, pigments of the spinel type have long been used to color glazes and as a component of decorative colors. Pigments which crystallize in a spinel type structure, e.g. Thenard blue ($CoAl_2O_4$) and copper chromite ($CuCr_2O_4$), are mostly very color-intensive pigments. Color pigments of the spinel type are usually essentially stable in regard to their color in the presence of an aggressive glass flux, but the so-called bleeding effect is disadvantageous. Because of the interaction of the pigment with the glass flux, the pigment is more or less dissolved, i.e. components of the pigment migrate into the surrounding glass flux and color it. This "bleeding" prevents the production of decorations with high contour sharpness. This effect is particularly noticeable for the Co-containing spinel $CoAl_2O_4$.

In order to prevent the bleeding problem and/or other instabilities during firing-on, such pigments have already been encapsulated in clear crystals of glaze-stable substances as described in German AS 23 12 535. Therein is described a process of heating a mixture of zirconium oxide, silicon oxide, and finely divided Thenard blue, a light blue inclusion pigment. The inclusion of spinel pigments in glaze-stable, colorless zirconium silicate crystals is therefore possible, but only very weakly colored inclusion pigments were obtained in this way.

The object of the invention is therefore to create coated spinel pigments with a higher color intensity than the colored spinels encapsulated in zirconium silicate crystals. Compared to the uncoated spinel color pigments, the new pigments are resistant to bleeding or at least bleed less during firing-on, and thus allow the production of decorations with improved contour sharpness.

SUMMARY OF THE INVENTION

The spinel color pigments coated according to the invention are characterized by a core of a colored spinel and a layer which at least partially coats this core. The coated layer includes a silicate material containing essentially silicon dioxide and one or more oxides chosen from the group of alkali metals, alkaline earth metals, earth metals and mixtures thereof, and may additionally contain ions originating from the coated spinel. "Earth metals" are defined as the trivalent elements from the third group of the periodic table, for example, aluminum, gallium, indium, thallium, scandium, yttrium, and lanthanum. Aluminum is a particularly preferred earth metal for use in accordance with this invention.

The core of the new color pigments of the invention amounts to preferably 45 to 60 wt. %, of the total weight, while the coating forms 55 to 40 wt. % of the total. In principle, pigments outside these limits may also be obtained, but products with a higher coating content become paler, and products with a higher core content show lower resistance against bleeding. The spinel color pigments coated according to the invention are a fine powder. The grain size (D50 value) of the pigments is generally above about 1 micrometer and below 20 micrometers. In practice, however, pigments with a D50 value below 10 micrometers, particularly below 5 micrometers, are preferred.

The coated spinel color pigments of the invention contain as a core, a colored spinel of the general formula $XY_2O_4$ or $X_2ZO_4$, whereby X is a bivalent element of the group Mn, Fe, Co, Ni, Cu, Zn, and Mg; Y is a trivalent metal of the group Al, Cr, Fe, and Mn; and Z is Ti.

A spinel may also contain two different X metals and/or two different Y metals. The following is a listing of examples of spinels which are preferably used in accordance with this invention: $CoAl_2O_4$, $(Co, Zn)Al_2O_4$, $Co(Al,Cr)_2O_4$, $CoCr_2O_4$, $Co_2TiO_4$, $CuCr_2O_4$, $NiFe_2O_4$, $(Fe,Zn)Fe_2O_4$, and $(Fe,Mn)(Fe,Mn)_2O_4$.

The cobalt-containing spinels are especially preferred, since the bleeding is particularly impaired in these compositions. With spinels of lower and/or optically less impairing bleeding tendency than the Co-containing spinels, it may also potentially be possible to achieve decorations with acceptable contour sharpness without the coating in accordance with the invention.

A high bleeding resistance is found in the pigments in accordance with the invention whose spinel core is coated as much as possible. A decreasing degree of coating will reduce the bleeding resistance. Intensive grinding of the initially highly coated spinel color pigments creates fracture points through which the color spinel may bleed during the firing-on of the ceramic decoration. During the production of the spinel color pigments coated according to the invention using the sintering process in accordance with this invention, it is preferred that spinels with such a particle size are used, and that a gentle grinding of the sintered product will be sufficient to obtain the desired fineness of the pigments.

The coating includes a silicate material and has a glassy, i.e. amorphous structure. The constituents of the coating are essentially $SiO_2$, as well as one or more oxides from the group of alkali metals, alkaline earth metals, earth metals and mixtures thereof. In addition, ions of the coated spinel may have penetrated into the silicate layer during the production of the color pigments of the invention.

The term "essentially" as used herein means that at least 95 wt. % of the coating layer consist of the above mentioned components; however, up to 5 wt. % of other standard glass components may be integrated into the silicate coating. Such additional components are conventional and well know to those skilled in the art, depending on the desired properties of the final product. These components may include various metal oxides as well as fluorides.

The coating may contain up to 5 wt. % of standard glass components as noted above. These components include one or more oxides from the group of $Li_2O$, $Na_2O$, $K_2O$, MgO, CaO, and $Al_2O_3$ as basic oxides, whereby alkali oxides, and here particularly $K_2O$, are preferred. The silicate layer coating the spinel core is preferably a glass with a very high $SiO_2$ content which has the desired high softening point and thus a high resistance to glass flux. Components which are known to reduce the softening temperature of glasses, e.g. lead oxide and boric acid, are not contained or contained only in a very small amount in the silicate coating.

In addition to these glass components, the silicate coating contains no other components, or at most, 1% by weight of other conventional glass components.

The spinel color pigments in accordance with the invention may be produced easily by sintering a homogeneous powder mixture of the colored spinel, silicon dioxide, and at least one mineralizer of the group of alkali metal halides, alkaline earth metal halides, and/or earth metal halides at about 900° to 1,300° C. for about 0.5 to 5 hours, and by grinding the sintered product, as necessary, wet or dry. The atomic ratio of silicon to alkali metal in the silicate layer of coated spinel color pigments obtained by using alkali chloride as a mineralizer ranges from about 6:1 to 60:1, and preferably from about 20:1 to 30:1. Only a smaller part of the alkali metal ions present during the process is integrated into the silicate network. The larger part is washed out of the pigment with water.

The used spinel and preferably also the remaining components are used in a finely divided form, for example with D50 value of about 0.1 to 20 micrometers, preferably 0.5 to 10 microns. It is especially preferred that the spinel to be coated has a D50 value of 0.5 to 2 micrometers. With suitable selection of the coating components and control of the sintering process, coated pigments with a D50 value of about 2 to 5 micrometers were obtained after gentle grinding of the sintered product.

The product to be sintered includes generally 25 to 60 wt. % of the colored spinel, 25 to 60 wt. % silicon dioxide, and 5 to 40 wt. % mineralizer. It is preferred that the powdered components are used in such an amount that the resulting pigments have 45 to 60 wt. % of spinel core. Halides, preferably chlorides, of the alkali metals, alkaline earth metals, and/or earth metals may be used as mineralizers. Examples of suitable mineralizers include at least one member of the group of LiCl, NaCl, KCl, $MgCl_2$, $CaCl_2$, and $AlCl_3$.

An especially preferred powder mixture consists of 33 to 45 wt. % silicon dioxide, 13 to 23 wt. % potassium chloride, and 42 to 50 wt. % colored spinel, in particular $CoAl_2O_4$. During the sintering process in the presence of air, oxygen and/or moisture, the halogen is completely or partially separated if halides are used, so that the resulting metal oxide may become a component of the silicate coating.

The person skilled in the art will determine optimum sintering temperature and sintering time, as well as the heating rate to reach the sintering temperature, through orientation tests. The sintered material is then, as required, ground gently and may also undergo a conventional post-treatment in order to dissolve soluble mineralizer components out of the coated pigment.

The spinel color pigments which are coated according to the invention are very color-intensive and have a high bleeding resistance, in contrast to previously known inclusion pigments. Therefore, these pigments are excellently suited for use in the production of color-intensive ceramic decorations with improved contour sharpness. Depending on the selection of the spinel forming the core, it is easily possible to obtain blue, green, brown, grey, or black coated spinel color pigments with high bleeding resistance.

DETAILED DESCRIPTION OF THE INVENTION

Figure 1:
FIG. 1 shows a decoration using a $CoAl_2O_4$ color pigment coated according to a known process, which pigment exhibits poor resistance to bleeding.
Figure 2:
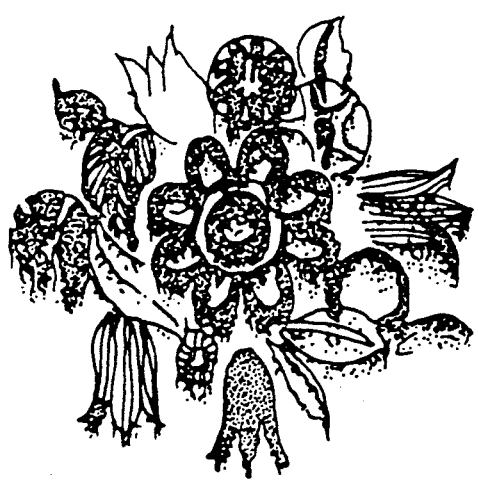
FIG. 2 shows the same decoration using the pure $CoAl_2O_4$ pigment in accordance with the invention and shows good resistance to bleeding.

In carrying out the application of the pigments as a decoration on a surface, such as ceramic or porcelain, the pigment was applied in screen printing oil. FIG. 1 shows a decoration using a $CoAl_2O_4$ color pigment coated onto a plate using a conventional technique. It was applied by screen printing onto a test porcelain plate coated with a transparent glaze (39.9% PbO; 0.5% $Na_2O$; 1.3% $K_2O$; 0.2% MgO; 4.7% CaO; 7.1% $Al_2O_3$; 39.7% $SiO_2$; 6.6% $B_2O_3$ -each in wt. %). It was fired-on using so-called oblique firing, since the bleeding behavior of a pigment may be seen most clearly with oblique positioning during firing. Likewise, FIG. 2 shows the same decoration using a pure $CoAl_2O_4$ pigment applied in the manner in accordance with the invention. The comparison between the two decorations, as shown in FIGS. 1 and 2, shows the superiority of the pigments in accordance with the invention.

Figure 3:
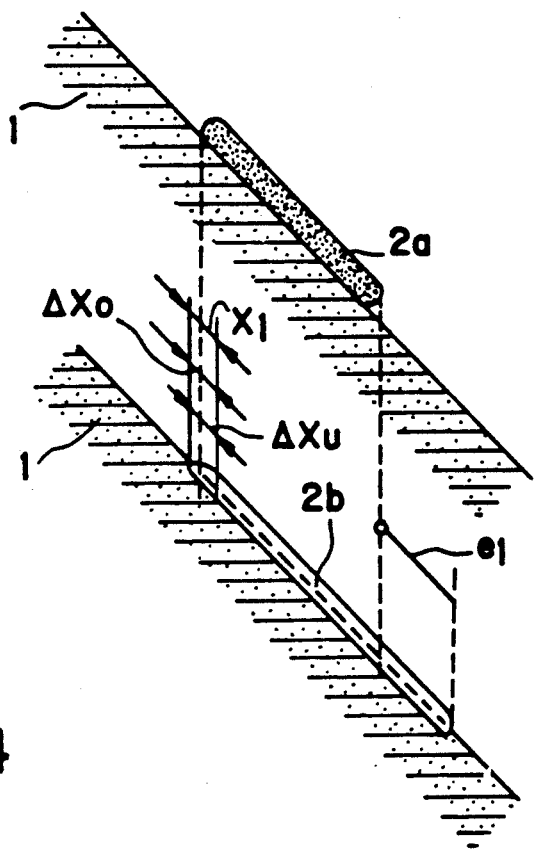
FIG. 3 shows a graphical representation of the contour sharpness of a conventional pigment before and after oblique firing.
Figure 4:
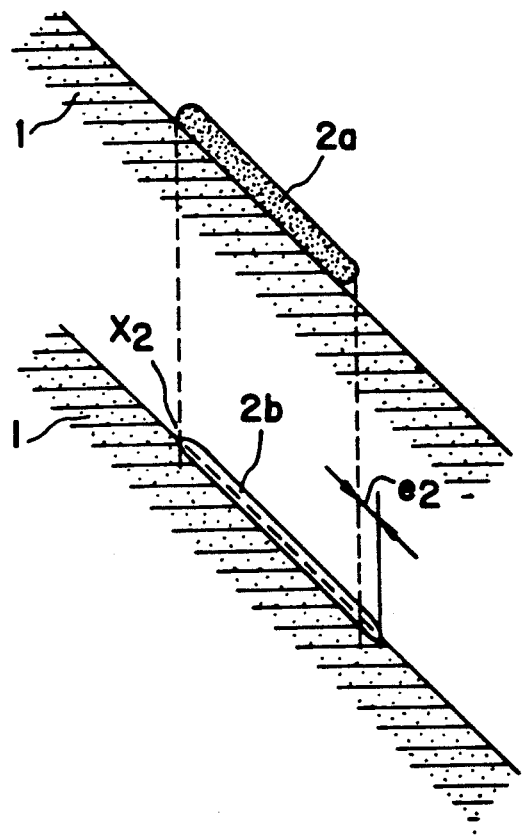
FIG. 4 shows a similar graphical representation as in FIG. 3 for the pigments in accordance with this invention.

FIGS. 3 and 4 show the difference in contour sharpness of the conventional pigments and pigments in accordance with the invention, respectively. In these figures the contour sharpness is shown graphically both before and after oblique firing. Like reference numbers represent the same feature in each figure. The improvement in accordance with the invention can be seen in the following comparison of FIGS. 3 and 4.

Reference number 1 represents the ceramic substrate. The area 2a in the figures represents the segment where the decoration is applied prior to oblique firing, and area 2b represents the corresponding segment after firing.

In the conventional pigment, shown in FIG. 3, the bleeding $e_1$ of the decoration is much greater than the bleeding $e_2$ shown in FIG. 4, for decorations made in accordance with the invention. Likewise, the top blurring $X_1$, as shown in FIG. 3 is much greater than the top blurring $X_2$ in FIG. 4.

In FIG. 3, the diffusion of color beyond the original top contour border is shown as $\Delta X_o$. Likewise, the area of reduced color intensity below the original top contour border is shown as $\Delta X_u$. These areas of color diffusion are not as noticeable in the pigments in accordance with the invention, as shown in FIG. 4.

The improvement of pigment surfaces by applying a protective film adapted to the particular end purpose has long been known. German OS 36 43 247 describes, for example, a process for improving the application and technical properties of a bismuth vanadate/molybdate pigment, whereby a layer of alkali metal silicate or alkaline earth metal silicate is applied to the pigment and is then covered with a wax emulsion. But the silicate layer of this coated pigment is not a glassy layer. Knowing the bleeding properties of spinels in the presence of glass fluxes, it was completely surprising that the coating of a colored spinel with a material of the composition of the invention significantly improved the bleeding behavior. Thus, the coated spinel color pigments of the invention may very well be used to produce sharp-contoured decorations using the standard printing processes or by way of transfer pictures. The pigment here may be used as a component of a decorative color or in standard organic printing media.

The following are illustrative examples relating to the invention.

EXAMPLES 1 to 6

Powder mixtures of the compositions given in the table below were sintered for 2 hours at 1000° C. after homogenization. After the sintering process they were ground for 5 minutes. The properties of the decoration which contained coated spinel color pigments, were produced according to the invention and applied as described above, and fired-on oblique firing are shown in the table in respect to color intensity and contour acuity.

Further variations and modifications will be apparent to those skilled in the art and are intended to be encompassed by the claims appended hereto.

German priority application P 40 14 928.5 is relied on and entirely incorporated herein by reference. All of the other references and documents noted in the above specification are entirely incorporated by reference.

TABLE

| Example | 1 | 2 | 3 | 4 | 5 | 6 |
|---|---|---|---|---|---|---|
| | Composition of the powder mixture (wt. %) | | | | | |
| $CoAl_2O_4$ | 49.3 | 53.5 | 35.5 | 35.4 | 42.3 | 43.6 |
| $SiO_2$ | 37.7 | 40.9 | 27.1 | 51.6 | 44.7 | 33.4 |
| KCl | 13.0 | 5.6 | 37.4 | 13.0 | 13.0 | 23.0 |
| Color intensity*) | +++ | +++ | + | + | +++ | +++ |
| Bleeding resistance*) | +++ | ++ | + | ++ | +++ | ++ |

*)high +++
medium ++
low +

We claim:

1. A coated spinel color pigment, comprising a core of colored spinel and a glassy coating layer which at least partially coats said core and which includes a silicate material consisting essentially of silicon dioxide and one or more oxides chosen from the group of alkali metals, alkaline earth metals, earth metals and mixtures thereof, wherein when the silicate coating material consists essentially of silicon dioxide and alkali metal oxides, the atomic ratio of silicon to alkali metal ranges from 6:1 to 60:1, and which may additionally contain one or more ions originating from the coated spinel.

2. The coated spinel color pigment according to claim 1, consisting essentially of 45 to 60 wt. % colored spinel and 55 to 40 wt. % glassy coating.

3. The coated spinel color pigment according to claim 2, wherein the spinel is of blue, green, brown, grey, or black color.

4. The coated spinel color pigment according to claim 2, wherein the silicate coating material consists essentially of silicon dioxide and alkali metal oxides.

5. The coated spinel color pigment according to claim 2, wherein the silicate coating material consists essentially of silicon dioxide and alkali metal oxides, metal and the atomic ratio of silicon to alkali metal is 20 to 30:1.

6. The coated spinel color pigment according to claim 1, wherein said spinel is a member chosen from the group of $CoAl_2O_4$, $(Co,Zn)Al_2O_4$, $CO(Al,Cr)_2O_4$, $CoCr_2O_4$, $Co_2TiO_4$, $CuCr_2O_4$, $NiFe_2O_4$, $(Fe,Zn)Fe_2O_4$, and (Fe,Mn) $(Fe,Mn)_2O_4$.

7. The coated spinel color pigment according to claim 6, wherein said spinel is $CoAl_2O_4$.

8. A process for the production of a coated spinel color pigment according to claim 1, comprising forming a homogeneous powder mixture of colored spinel, silicon dioxide, and at least one mineralizer of the group of alkali halides, alkaline earth halides, earth metal halides and mixtures thereof and sintering at 900° to 1,300° C. for 0.5 to 5 hours, thereafter grinding the sintered product.

9. The process according to claim 8, further comprising forming a powder mixture which consists essentially of 25 to 60 wt. % of the colored spinel, 25 to 40 wt. % silicon dioxide, and 5 to 40 wt. % mineralizer.

10. The process according to claim 8 wherein the D50 value of said spinel is in the range from 0.5 to 10 micrometers.

11. The process according to claim 10, wherein the D50 value of the other components is in the range from 0.5 to 10 micrometers.

12. The process according to claim 9, wherein a powder mixture is formed consisting essentially of 33 to 45 wt. % silicon dioxide, 13 to 23 wt. % potassium chloride, and 42 to 50 wt. % colored spinel.

13. The process according to claim 12, wherein said spinel is $CoAl_2O_4$.

14. A process for producing ceramic decorations with improved contour sharpness comprising depositing a spinel color pigment according to claim 1 onto a substrate and firing at a sufficiently high temperature to obtain the desired decoration.

15. The coated spinel color pigment according to claim 1, wherein the oxide of the alkali metals, alkaline earth metals or earth metals is at least one member chosen from the group of $Li_2O$, $Na_2O$, $K_2O$, MgO, CaO, or $Al_2O_3$.

16. The process according to claim 8, wherein the mineralizer is at least one member chosen from the group of LiCl, NaCl, KCl, $MgCl_2$, $CaCl_2$, or $AlCl_3$.

17. The process according to claim 8, wherein the mineralizer is KCl.

18. A coated spinel color pigment, comprising a core of colored spinel and a glassy coating layer which at least partially coats said core, at least 95% of said coating by weight includes a silicate material including silicon dioxide and one or more oxides chosen from the group of alkali metals, alkaline earth metals, earth metals and mixtures thereof, wherein when the silicate coating material consists essentially of silicon dioxide and alkali metal oxides, the atomic ratio of silicon to alkali metal ranges from 6:1 to 60:1, and which may additionally contain one or more ions originating from the coated spinel.

19. The coated spinel color pigment according to claim 18, consisting essentially of 45 to 60 wt. % colored spinel and 55 to 40 wt. % glassy coating.

20. The coated spinel color pigment according to claim 18, wherein said coating includes up to 5% by weight of a conventional glass additive component.

21. The coated spinel color pigment according to claim 18, wherein the oxide of the alkali metals, alkaline earth metals or earth metals is at least one member chosen from the group of $Li_2O$, $Na_2O$, $K_2O$, MgO, CaO, or $Al_2O_3$.

22. A coated spinel color pigment having a reduced tendency to bleed during use, comprising a core of colored spinel and a glassy coating layer which at least partially coats said core and which includes a silicate material consisting essentially of silicon dioxide and one or more oxides chosen from the group of alkali metals, alkaline earth metals, earth metals and mixtures thereof, wherein when the silicate coating material consists essentially of silicon dioxide and alkali metal oxides, the atomic ratio of silicon to alkali metal ranges from 6:1 to 60:1, and which may additionally contain one or more ions originating from the coated spinel, wherein said spinel has a tendency to bleed during firing when not coated with the coating layer.

23. The coated spinel color pigment according to claim 22, wherein said spinel is a member chosen form the group of $CoAl_2O_4$, $(Co,Zn)Al_2O_4$, $Co(Al,Cr)_2O_4$, $CoCr_2O_4$, $Co_2TiO_4$, $CuCr_2O_4$, $NiFe_2O_4$, $(Fe,Zn)Fe_2O_4$, and $(Fe,Mn)(Fe,Mn)_2O_4$.

24. The coated spinel color pigment according to claim 23 wherein said spinel is $CoAl_2O_4$.

25. The coated spinel color pigment according to claim 22, wherein the spinel is a cobalt containing spinel.

26. The coated spinel color pigment according to claim 23, consisting essentially of 45 to 60 wt. % colored spinel and 55 to 40 wt. % glassy coating.

27. The coated spinel color pigment according to claim 26, wherein the spinel is of blue, green, brown, grey, or black color.

28. The coated spinel color pigment according to claim 26, wherein the silicate coating material consists essentially of silicon dioxide and alkali metal oxides.

29. The coated spinel color pigment according to claim 26, wherein the silicate coating material consists essentially of silicon dioxide and alkali metal oxides, and the atomic ratio of silicon to alkali metal is 20 to 30:1.

30. A process for producing a ceramic decoration having a reduced tendency to bleed during firing, comprising:

applying a spinel colored pigment to a substrate and firing said pigment onto said substrate, wherein said spinel color pigment includes a glassy coating layer which consists essentially of silicon dioxide and an oxide chosen from the group of alkali metals, alkaline earth metals, earth metals and mixtures thereof, wherein when the silicate coating material consists essentially of silicon dioxide and alkali metal oxides, the atomic ratio of silicon to alkali metal ranges from 6:1 to 60:1, wherein the spinel in the spinel color pigment has a reduced tendency to bleed during firing because of the presence of the glassy coating layer.

31. The process according to claim 30, wherein said spinel is a member chosen from the group of $CoAl_2O_4$, $(Co,Zn)Al_2O_4$, $Co(Al,Cr)_2O_4$, $CoCr_2O_4$, $Co_2TiO_4$, $CuCr_2O_4$, $NiFe_2O_4$, $(Fe,Zn)Fe_2O_4$, and $(Fe,Mn)(Fe,Mn)_2O_4$.

32. The process according to claim 30, wherein said spinel is $CoAl_2O_4$.

33. The process according to claim 30, wherein the spinel is a cobalt containing spinel.

* * * * *